Dec. 2, 1952 R. D. BEATTY, JR 2,620,243
ANTIFRICTION BEARING ASSEMBLY
Filed May 20, 1950
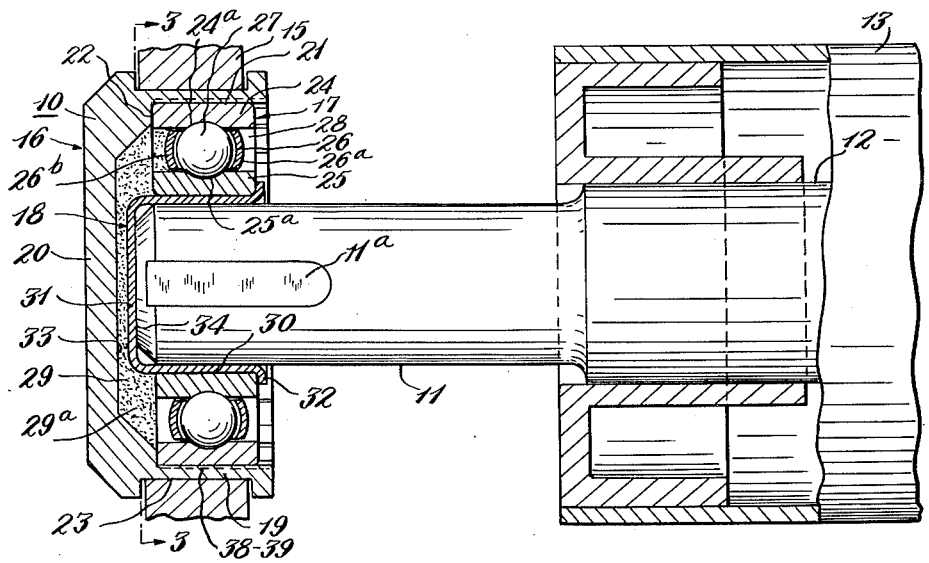
Fig. 2
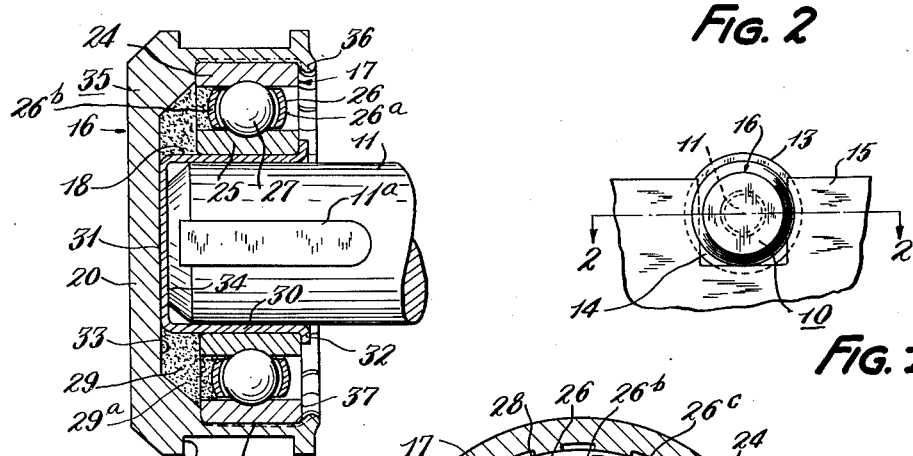
Fig. 4
Fig. 1
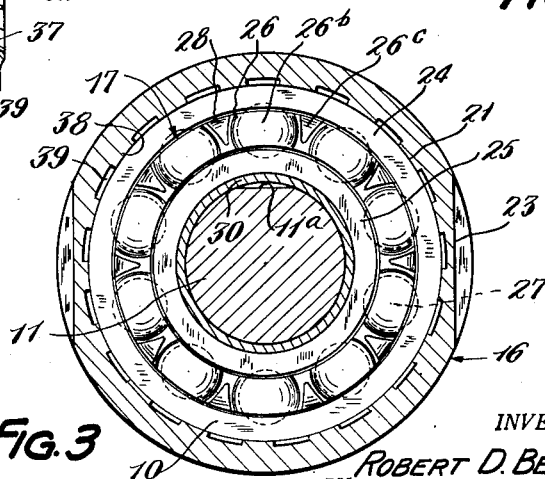
Fig. 3
INVENTOR.
ROBERT D. BEATTY JR.
BY Hudson, Boughton,
Williams, David & Hoffmann
ATTORNEYS Patented Dec. 2, 1952

2,620,243

UNITED STATES PATENT OFFICE 2,620,243

ANTIFRICTION BEARING ASSEMBLY

Robert D. Beatty, Jr., Shaker Heights, Ohio, assignor to Manor Die Cast Corporation, Cleveland, Ohio, a corporation of Ohio Application May 20, 1950, Serial No. 163,153

5 Claims. (Cl. 308—187.2)

This invention relates to antifriction bearings for supporting rotatable shafts or the like and, as one of its objects, aims to provide a self-contained antifriction bearing of an extremely simple and economical novel construction comprising a minimum number of parts and requiring substantially no machining operations, and which contains an initial supply of lubricant.

Another object of this invention is to provide such a self-contained antifriction bearing comprising a preformed standard antifriction bearing unit mounted in a substantially cup-shaped housing by the relatively fixed engagement of the outer race of the bearing unit therein and a thimble or socket member engaging in and rotatable with the inner race and adapted to receive an end of the shaft to be supported, and in which the bearing unit and thimble together form a closure for the open end of the housing.

A further object is to provide a novel self-contained antifriction bearing of the character mentioned in which the preformed bearing unit is disposed in spaced relation to an imperforate transverse end wall of the housing so as to define a lubricant chamber therein, and in which the bearing unit and thimble form the sole closure means for the lubricant chamber.

Still another object is to provide a novel self-contained antifriction bearing of the kind above referred to in which the thimble has a transverse inner end wall engaged by the end of the shaft and at its outer end has flange means which engages the outer end of the inner race.

The invention can be further briefly summarized as consisting in certain novel combinations and arrangements of parts hereinafter described and particularly set out in the claims hereof.

In the accompanying sheet of drawings,

Fig. 1 is an elevation showing this improved antifriction bearing used as a mount for one end of a conveyor roll;

Fig. 2 is a section taken through the bearing axially thereof and on a substantially horizontal plane, as indicated by section line 2—2 of Fig. 1, and with a portion of the conveyor roll also shown in section;

Fig. 3 is a transverse section taken through the bearing on section line 3—3 of Fig. 2; and Fig. 4 is an axial section similar to Fig. 2 but showing a modified form of the improved bearing.

In the embodiment of the invention shown in Figs. 1, 2 and 3, the improved bearing assembly 10 is used for rotatably supporting a shaft end 11 which, in this instance, is a portion of a shaft or spindle 12 carrying a conveyor roll 13. The bearing assembly 10 is mounted in a recess 14 of a conveyor frame or side rail 15 for rotatably mounting one end of the conveyor roll 13 thereon.

This improved bearing assembly 10 comprises a housing 16, a preformed or prefabricated standard antifriction bearing unit 17 mounted therein and a thimble 18 supported by the bearing unit and adapted to receive the shaft end 11.

The housing 16 is a substantially cup-shaped one-piece metal member comprising an annular side wall 19 and an imperforate transverse bottom or end wall 20. The inner surface of the annular side wall 19 forms a substantially cylindrical radial seat 21 in which the antifriction bearing unit 17 is mounted, as will be presently explained. The annular side wall 19 is also provided with an internal substantially radial annular shoulder 22 which forms an axial seat for the inner end of the antifriction bearing unit 17. The housing 16 can be constructed in any suitable way but is preferably produced as a die casting which will be very accurate as to size and shape and will require substantially no machining operations thereon. For the purpose of mounting the bearing assembly 10 in the recess 14 of the conveyor side rail 15, the housing 16 can be provided with grooves 23 at substantially diametrically opposite sides thereof which cooperate with the sides of the recess 14 for preventing lateral shifting or rotation of the bearing assembly in such recess.

The preformed standard antifriction bearing unit 17 comprises outer and inner coaxial annular races 24 and 25, an annular cage 26 and an annular series of balls 27 disposed between the outer and inner races and engaged by the cage. The outer and inner races are provided, respectively, with annular grooves 24a and 25a in which the balls 27 are seated for rolling engagement. The cage 26 may be of any suitable construction and, as here shown, may comprise a pair of sheet metal ring members 26a and 26b which are secured together between each pair of balls, as indicated at 26c, and have complemental portions forming circumferentially spaced pockets for the individual balls of the series. The cage 26 is of a radial width such that it substantially closes the annular space 28 between the outer and inner races but, by reason of small clearances provided between the cage and the outer and inner races, is freely movable in this annular space in the manner which is conventional for cages of this character.

The antifriction bearing unit 17 is mounted in the housing 16 by the outer race 24 having its outer annular face in engagement with the annular seat 21 of the housing and its inner end face in engagement with the annular seat 22. The bearing unit 17 is inserted into the housing 16 through the open end thereof and the outer race 24 is of a size to have a press fit engagement with the annular seat 21 as the result of which this bearing unit is mounted in a substantially fixed relation in the housing. By engagement of the inner end face of the outer race 24 with the annular seat 22, the bearing unit 17 is located in an axially spaced relation to the imperforate end wall 20 so as to define with the latter an intervening lubricant chamber 29 in which an initial supply of lubricant 29a can be provided.

The thimble 18 comprises a substantially cup-shaped one-piece socket member having a substantially cylindrical side wall or sleeve portion 30 and an imperforate transverse end wall 31 at the inner end thereof. The thimble 18 is mounted in the inner race 25 and forms a closure for the opening of this race. The sleeve portion 30 of the thimble is of a size to have a press fit engagement in the opening of the inner race 25 such that the thimble will be rotatable with the inner race. At its outer end the sleeve portion 30 of the thimble is provided with an outturned substantially radial flange 32 which engages the outer end face of the inner race 25. The sleeve portion 30 is preferably of a length such that the transverse inner end wall 31 will be located in spaced relation to the flat inner face 33 of the transverse end wall 20 of the housing 16 as shown in Fig. 2.

The shaft end 11 is of a size to have a snug fit in the socket of the thimble 18 such as to mount the bearing assembly 10 on the shaft end and such that the thimble and inner race 25 will rotate with this shaft end. A flat face 34 provided at the inner end of the shaft 11 engages the transverse end wall 31 of the thimble when the shaft end is fully inserted thereinto. To normally prevent relative rotation between the shaft end 11 and the thimble 18, the shaft end can be provided with a cut-away portion or flat 11a on one side thereof which will form an interlock between the shaft and the sleeve portion 30 for preventing such relative rotation during the normal or regular service of the bearing.

The thimble 18 is preferably a sheet metal member which can be produced economically by the use of suitable drawing or spinning dies and, in accordance with another feature of this invention, is made of a relatively soft metal such as aluminum. One advantage in making the thimble of soft metal is that it will then not need to be formed to extreme accuracy since the soft metal will enable the thimble to accommodate itself to the shaft end 11 with respect to small irregularities or variations of the latter and permits the thimble to conform more or less to the non-circular shape of the shaft at the location of the flat 11a.

When the shaft end 11 is moved into the thimble 18, the latter is thereby slightly distended at all points around the periphery thereof except at the location of the flat 11a. This causes the portion of the thimble which bridges the flat to be placed in tension with the result that this bridging portion tends to be pulled or deflected slightly toward the flat, causing the sharp edges of the flat to be more or less indented into the wall of the thimble at the ends of the bridging portion. The soft character of the metal of the thimble readily permits this slight deflection of the bridging portion and slight indentation by the edges of the flat, under these conditions, to produce the above-mentioned interlock between the shaft end and thimble.

Another advantage resulting from the use of soft metal for the thimble 18 is that this member will serve as a bushing in which the shaft end 11 can rotate in the event that freezing of the antifriction bearing unit 17 causes the inner race 25 to be held stationary. When the thimble serves as a bushing for the shaft end 11 during such an abnormal condition of operation, the shaft end is prevented from being damaged by rubbing against the hard steel inner race 25 and, hence, when the abnormal condition is corrected it is usually not necessary to replace the shaft 12. Upon the occurrence of the abnormal condition just mentioned, the shaft 11 continues to rotate but the thimble being connected with the inner race 25 by the press fit mentioned above, is held against rotation by the frozen condition of the inner race. In view of the softness of the metal of the thimble, the interlock yields by a deformation or distention of the thimble at the location of the flat 11a and the shaft then rotates in the thimble as a bushing.

In the bearing construction above described it will be seen that the antifriction bearing unit 17 is a preformed standard ball bearing and therefore can be very economically obtained from various bearing manufacturers who produce such standard ball bearings in large quantities. To form the improved bearing assembly 10, it is only necessary to assemble the preformed standard antifriction bearing unit 17 in the die cast housing 16 and to assemble the thimble 18 in the inner race 25. During this assembly operation an initial supply of the lubricant 29a is introduced into the lubricant chamber 29. The bearing assembly 10 thus produced is immediately ready for use for supporting the conveyor roll 13 or for any other desired purpose.

In this improved bearing assembly it will also be seen that the bearing unit 17 and the thimble 18 together form the sole closure means for the lubricant chamber 29. Since the cage 26 is in close running engagement with the outer and inner races 24 and 25, the lubricant will be effectively retained in the lubricant chamber and to the extent that only a small amount of the lubricant will leak out past the balls 27 and this small amount of escaping lubricant will serve the purpose of carrying out or excluding dust and other foreign matter.

It should also be explained in connection with the housing 16 that since this member is of a very plain and simple form, it can be economically produced as a die casting which will require substantially no machining except the forming of the diametrically opposed grooves 23. To facilitate the forming of the above-mentioned press fit engagement between the outer race 24 and the annular seat 21, the housing 16 is provided with an annular series of serrations extending around the seat 21. These serrations consist of alternate teeth and grooves 38 and 39, as shown in Fig. 3, and accommodate minor irregularities in the size or shape of the bearing unit 17 or in the housing 16 by permitting a displacement of metal from the teeth 38 into the slots 39, where needed, in forming the press fit.

In Fig. 4 of the drawings an antifriction bearing assembly 35 is shown which is of a construction similar to the bearing assembly 10 above described and which comprises similar parts designated by the same reference characters but in which the preformed standard antifriction bearing unit 17 is retained in the recess of the cup-shaped housing 16 by an annular lip or flange 36 provided on the housing around the open end thereof and which lip or flange has been deflected inwardly into an overhanging relation to the outer end face 37 of the outer race 24 as by a spinning operation. In the modified bearing assembly 35 the sleeve portion 30 of the thimble 18 is shown as being of a length such that the transverse end wall 31 is in seating engagement with the flat inner face 33 of the imperforate end wall 20 of the housing. In other respects, the bearing assembly 35 corresponds with the bearing assembly 16 and accomplishes similar new results and advantages.

Although the improved antifriction bearing assembly provided by this invention has been illustrated and described herein to a somewhat detailed extent it will be understood, of course, that the invention is not to be regarded as being limited correspondingly in scope but includes all changes and modifications coming within the terms of the claims hereof.

Having thus described my invention, I claim:

1. In a self-contained antifriction bearing, a housing having a recess extending thereinto from one end and having a transverse imperforate end wall at its other end, said housing also having an annular side wall surrounding said recess, a prefabricated standard ball bearing unit comprising inner and outer coaxial annular races and an annular series of ball elements disposed between said races and also comprising an annular cage engaging said balls and disposed between and having small running clearances with said inner and outer races, said bearing unit being mounted in said housing in spaced relation to said end wall so as to cooperate therewith in defining a lubricant chamber in a portion of said recess and with a press fit engagement between said outer race and said annular side wall, lubricant in said lubricant chamber, and a socket cup engaging in said inner race for rotation therewith and adapted to receive the end of a shaft or the like to be rotatably supported, said bearing unit and said socket cup forming the sole closure means for said recess for retaining said lubricant in said lubricant chamber.

2. A self-contained antifriction bearing comprising, a substantially cup-shaped housing having an annular side wall and also having an end opening at one end defined by said annular side wall and an imperforate transverse end wall at the other end, a prefabricated standard antifriction bearing unit comprising inner and outer races and a cage and a series of rolling elements disposed between said races and engaged by said cage, said bearing unit being mounted in said housing in cooperating spaced relation to said end wall to define therewith a lubricant chamber and with said outer race engaging said annular side wall and said inner race in substantially coaxial relation to said end opening, and a substantially cup-shaped socket member engaging in said inner race for rotation therewith and adapted to receive the end of a shaft or the like to be rotatably supported, said bearing unit and said socket member together forming a closure for said lubricant chamber, said socket member having at its inner end a transverse end wall engaged by the end of said shaft and lying against said transverse end wall of said housing and at its outer end having a substantially radial flange engaging the outer end face of said inner race.

3. In a self-contained antifriction bearing, a substantially cup-shaped housing having an end opening and a bottom wall, a prefabricated standard antifriction bearing unit comprising inner and outer races and a cage and a series of rolling elements disposed between said races and engaged by said cage, said bearing unit being mounted in said housing in cooperating spaced relation to said bottom wall to define therewith a lubricant chamber and with said outer race in substantially fixed relation to said housing and said inner race in substantially coaxial relation to said end opening, and a substantially cup-shaped socket member engaging in said inner race for rotation therewith and adapted to receive the end of a shaft or the like to be rotatably supported, said prefabricated bearing unit and said socket member together forming a closure for said lubricant chamber and said socket member being made of a relatively soft metal so as to form a bushing in which the shaft end can rotate when said inner race is held stationary during an abnormal condition of operation.

4. In a self-contained antifriction bearing, a housing in the form of a casting made of die-cast metal and having a recess extending thereinto from one end and also having a transverse imperforate end wall at its other end, said housing also having an annular side wall surrounding said recess, a prefabricated standard ball bearing unit comprising inner and outer coaxial annular races and an annular series of ball elements disposed between said races and also comprising an annular cage engaging said balls and disposed between and having small running clearances with said inner and outer races, said bearing unit being mounted in said housing in spaced relation to said end wall so as to cooperate therewith in defining a lubricant chamber in a portion of said recess and with a press fit engagement between said outer race and said annular side wall, lubricant in said lubricant chamber, and a socket cup engaging in said inner race for rotation therewith and adapted to receive the end of a shaft or the like to be rotatably supported, said bearing unit and said socket cup forming the sole closure means for said recess for retaining said lubricant in said lubricant chamber and said annular side wall being serrated to facilitate the formation of the press fit engagement of said outer race therewith.

5. In an antifriction bearing, a housing, a prefabricated antifriction bearing unit mounted in said housing and comprising inner and outer races and a cage and a series of rolling elements disposed between said races and engaged by said cage, a substantially cup-shaped socket member engaging in said inner race so as to be connected for rotation therewith, a shaft end or the like extending into said socket member, cooperating portions of said socket member and shaft end forming an interlock therebetween for rotation of said socket member and inner race with said shaft end during normal operation of said bearing, said socket member being made of a relatively soft metal so as to be deformable for the release of said interlock and so as to form a bushing in which said shaft end can rotate when an abnormal condition of operation causes said inner race to be held substantially stationary.

ROBERT D. BEATTY, Jr.

REFERENCES CITED

The following references are of record in the file of this patent:

UNITED STATES PATENTS

| Number | Name | Date |
|---|---|---|
| 1,251,110 | Ross | Dec. 25, 1917 |
| 2,266,300 | Bebinger | Dec. 16, 1941 |

FOREIGN PATENTS

| Number | Country | Date |
|---|---|---|
| 779,325 | France | Jan. 14, 1935 |